UNITED STATES PATENT OFFICE.

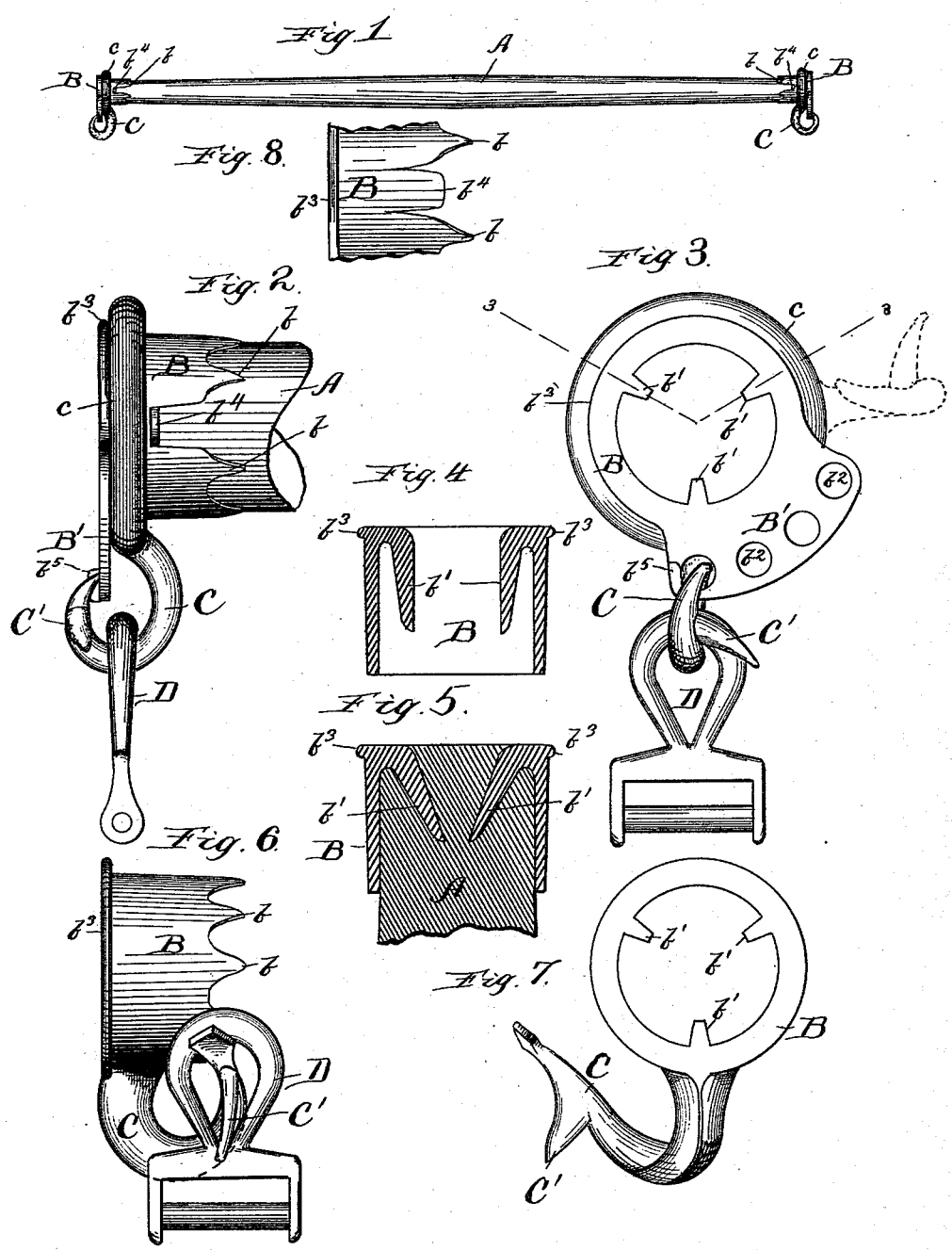

WILLIAM WORTH BURSON, OF CHICAGO, ILLINOIS.

WHIFFLETREE CLIP AND HOOK.

SPECIFICATION forming part of Letters Patent No. 439,289, dated October 28, 1890.

Application filed February 10, 1890. Serial No. 339,885. (No model.)

*To all whom it may concern:*

Be it known that I, WILLIAM WORTH BURSON, a citizen of the United States, residing at Chicago, in the county of Cook and State of Illinois, have invented a new and useful Improvement in Whiffletree Clips and Hooks, of which the following is a specification.

My invention relates to clips and hooks for whiffletrees and other purposes; and the objects of my invention are, first, to provide a clip which is cheaply made and easily attached to the wood and which will not work loose by use; second, to provide a clip to which the draft-hook can be easily attached; third, to provide a hook from which the trace will not come unhitched in practical use. I attain these objects by the mechanism illustrated in the accompanying drawings, in which—

Figure 1 shows whiffletree complete, except central-draft clip. Fig. 2 is a side view of the clip attached to the wood. Fig. 3 is an end view of the clip. The dotted lines show position of the draft-hook in position to hitch and unhitch the trace. Fig. 4 shows a longitudinal section of Fig. 3 on the lines 3 3. Fig. 5 shows same section after the clip is driven on the wood. Figs. 6 and 7 show a modified form of the clip and hook, in which the hook is cast integral with the clip. Fig. 8 shows a side view of $b^4$ as cast.

Similar letters refer to like parts throughout the several views.

The whiffletree A, or other wooden part requiring a clip, may be of any shape desired, but is preferably made either oval or round and slightly tapered toward the end. The clip B is made to fit the wood, and the inner end may terminate in points $b$ $b$, though this feature may be omitted, when desired. The clip has the intra-nails $b'$ $b'$, the head ends of which are attached to the inner surface of the outer end of the clip and extend longitudinally about parallel with the inner surface of the clip, so that they can be readily cast. It is preferred to have the heads of the nails near the inner surface of the clip and to bevel the points most on the side next to the clip to make a better pattern to mold, as also to incline the nails when driven to point toward the center of the wooden part, Figs. 4 and 5; but this construction may be varied to suit the particular situation in which the clip is used. The clip B is also provided with the flange B', in which are the holes $b^2$ $b^2$, Figs. 2 and 3. This flange B' extends radially outward, so as to guard the point of the hook and around about one-third the circumference of the clip from the outer end of the same and in connection with the bead $b^3$ hold the ring of hook C from coming off the outer end of the clip. Clip B has also the short flange or tooth $b^4$, which is preferably cast parallel with the sides of the clip and separated by a narrow opening from the same, so that when the hook B is placed on the clip this tooth $b^4$ can be bent outward at right angles to the side of the clip and hold the hook from slipping endwise, while permitting it to turn freely radially. One or more of these teeth can be made on the clip, as may be desired.

The hook C has the ring $c$, adapted to encircle the clip, and the safety-spur C'. This safety-spur is preferably between the turn of the hook where the cockeye D of the trace draws and the re-turned end of the hook and at such distance from the end that the cockeye when slipping backward and arrested by the spur cannot pass over the end of the hook. When the hook is drawn upon, the safety-spur C' is substantially vertical to the line of draft, Figs. 2, 6, and 7.

By reference to the Figs. 2, 3, and 4 it will be seen that the clip B, with the intra-nails $b'$ and tooth $b^4$, is made so as to readily draw from the mold, and that the ring $c$ of hook C can be placed on the clip and the tooth $b^4$ bent outward, limiting the endwise movement of the said ring and hook, but permitting the hook to turn freely on the clip. The stop $b^5$ on B' limits the downward movement of the hook, and the hook is turned upward to the positions shown in dotted lines, Fig. 3, to hitch or unhitch the trace. The return end of the hook C is bent slightly upward, and thereby tends to enter one of these holes, and is thus prevented from raising to the position where it would be possible to unhitch the trace from the hook. When the clip is driven on the wood, the intra-nails, on account of their slender points, are usually deflected from a straight line and hold the clip very securely in place, even if the wood shrinks after the clip is driven on. When the wood shrinks, if desired, the clip can be driven farther on, since the end is open, while the points $b$ can be driven into the wood, as is well known. The application of the intra-nails $b'$, one or more of which may be made, and safety-spur $C'$ is shown in Figs. 6 and 7 in connection with a hook and clip cast integral, which is a desirable form for many purposes. The clip and hook herein described are preferably cast of malleable or mites iron.

I am aware that a single wedge has been cast in a whiffletree-clip, and that two or more small wedges have been attached to a bar extending across the outer end of the clip, designed to pierce the wood, and that detached nails have also been used to fasten the clip upon the wood, and I do not claim any of these things; but I am not aware that intra-nails have ever been cast with heads attached to the inner surface of the outer end of the clip, designed to pierce the wood when the clip is driven on and to hold the clip securely in place. I am also aware that a hook is in use which turns upon the clip to a recess where the trace can be hitched and then turns down to lock it; but I am not aware that a flange has been used as here shown.

Various changes can be made in the construction and arrangement of the within-described parts without departing from the scope of my invention.

What I claim as my invention, and desire to secure by Letters Patent, is—

1. A whiffletree-clip provided with the intra-nails $b'$, cast integral therewith, adapted when driven on the wood to hold the clip securely in position, the safety-flange $B'$, bead $b^3$, adapted to hold the draft-hook from coming off the outer end of the clip, and the points $b^4$, adapted when bent outward and upward to hold the hook from moving endwise toward the middle of the whiffletree, in combination with a draft-hook, operating substantially as and for the purpose set forth.

2. The combination of a whiffletree-clip provided with a safety-flange extending partly around its outer end and a draft-hook adapted to turn upon said clip and to engage the end of the trace by turning upward and to lock the trace to said hook by turning downward, with a part on the inner end of said clip adapted to be bent outward to hold the hook in position, substantially as set forth.

3. The combination of a whiffletree-clip provided with a safety-flange, said flange provided with locking-holes or their equivalent, and a draft-hook adapted to turn upon said clip to hitch to the trace and to lock the end of the hook in the holes of the flange, substantially as set forth.

4. An open-ended whiffletree-clip provided interiorly with a nail or spike secured at its outer or head end to the side wall of the clip and having its free end extending in the general direction of the length of the clip, substantially as described.

5. The combination of a whiffletree-clip and a draft-hook encircling the clip and turning thereon, the hook being provided with a laterally-projecting horn or spur, as $C'$, to prevent the trace-hook from slipping over its end, substantially as described.

6. An open-ended tubular whiffletree-clip provided interiorly with nails or spikes secured at their head ends to the side walls of the outer ends of the clip and having their free points or ends extending in the general direction of the length of the clip, substantially as described.

7. The combination, with the tubular open-ended whiffletree-clip provided interiorly with nails or spikes secured at their head ends to the side walls of the clip and extending lengthwise therein, of a draft-hook encircling and turning on the clip, said hook having a spur, as $C'$, projecting laterally therefrom, substantially as described.

WILLIAM WORTH BURSON.

Witnesses:
JOHN HEWITT,
H. M. MUNDAY.